United States Patent

Shimazaki et al.

[11] Patent Number: 5,848,112
[45] Date of Patent: Dec. 8, 1998

[54] METHOD OF TRANSPORTING NUCLEAR FUEL SUBSTANCE

[75] Inventors: Teruaki Shimazaki, Naka-gun; Masatoshi Yoshioka, Mito, both of Japan

[73] Assignee: Sumitomo Metal Mining Co., Ltd., Tokyo, Japan

[21] Appl. No.: 784,391

[22] Filed: Jan. 17, 1997

[30] Foreign Application Priority Data

Jan. 30, 1996 [JP] Japan ................................. 8-035576

[51] Int. Cl.⁶ .............................. G21F 5/00; G21C 19/00
[52] U.S. Cl. ................... 376/272; 250/506.1; 250/507.1
[58] Field of Search .................. 376/272; 250/506.1, 250/507.1

[56] References Cited

U.S. PATENT DOCUMENTS

| | | | |
|---|---|---|---|
| 4,476,394 | 10/1984 | Muller et al. | 250/507.1 |
| 4,535,250 | 8/1985 | Fields | 250/507.1 |
| 4,746,487 | 5/1988 | Wachter | 376/272 |
| 4,783,309 | 11/1988 | Popp et al. | 376/272 |
| 5,232,657 | 8/1993 | Kovacik et al. | 376/272 |
| 5,629,964 | 5/1997 | Roberts | 376/272 X |
| 5,641,970 | 6/1997 | Taniuchi et al. | 250/506.1 |

FOREIGN PATENT DOCUMENTS

| | | |
|---|---|---|
| 63-5300 | 1/1988 | Japan . |
| 1119799 | 5/1989 | Japan . |
| 1124799 | 5/1989 | Japan . |
| 22995 | 1/1990 | Japan . |

Primary Examiner—Charles Jordan
Assistant Examiner—M. J. Lattig
Attorney, Agent, or Firm—Watson Cole Grindle Watson, P.L.L.C.

[57] ABSTRACT

There is provided a method of transporting a nuclear fuel substance capable of increasing an amount of storing the nuclear fuel substance of a transport vessel by lowering the neutron effective multiplication factor by arranging neutron absorber plates among a plurality of nuclear fuel storing drums for storing the nuclear fuel substance, or at the inside of the respective nuclear fuel storing drums in transporting the nuclear fuel substance.

According to the present invention, in transporting the nuclear fuel substance by containing a pile of the plurality of nuclear fuel storing drums in series for storing the nuclear fuel substance in the transport container along the vertical central axis of the transport container having substantially the bottomed cylinder shape, the neutron absorber plates each including a component for absorbing neutrons are interposed among the respective nuclear fuel storing drums on planes orthogonal to a vertical central axis of the transport container.

12 Claims, 4 Drawing Sheets

METHOD OF TRANSPORTING NUCLEAR FUEL SUBSTANCE

BACKGROUND OF THE INVENTION

1. Description Of The Invention

The present invention relates to a method of safely transporting a nuclear fuel substance while a storing amount of the nuclear fuel substance stored in a transport container is made to remain subcritical even if the amount is increased more than the conventional amount with no change in the structure, material and dimensions of a transport container and a fuel storing drum which have been used conventionally.

2. Description Of The Prior Arts;

Conventionally, a nuclear fuel substance has been transported by storing it in small divisions in a plurality of nuclear fuel storing drums which are contained in a pile in series along a vertical central axis of an inner vessel of a transport container comprising the inner vessel having a section in a bottomed cylinder shape, an insulating material for absorbing and shielding heat and impact from outside by disposing it around the inner vessel for protecting the inner vessel, an outer vessel in a bottomed cylinder shape for containing the inner vessel and the insulating material and lids for closing upper openings of the both vessels.

Now, the mass of a nuclear fuel substance stored in the transport container is limited in accordance with an amount of an included nuclear fission substance such that the amount of the nuclear fuel substance capable of being stored in the transport container does not reach the amount of criticality. In other words, the amount is limited such that the neutron effective multiplication factor per transport container is smaller than a prescribed value of 0.95. Therefore, in transporting a nuclear fuel substance having especially high enrichment, the nuclear fuel substance had to be transported while satisfying the mass limitation imposed on the stored nuclear fuel substance as a whole by reducing a number of the nuclear fuel storing drums in the transport container in order to limit the amount of storing the nuclear fuel substance in the nuclear fuel storing drums for storing the nuclear fuel substance in small divisions.

That is, in spite of the fact that if there were no critical mass limitation of a transported nuclear fuel substance, a single nuclear fuel storing drum is provided with a space capable of storing approximately 26 kg of a uranium oxide nuclear fuel and three of the nuclear fuel storing drums can be contained in a single transport container, if the enrichment of the nuclear fuel is approximately 4.9%, only about 17 kg thereof has to be stored in each of the nuclear fuel storing drums, since the amount of the uranium oxide nuclear fuel in the transport container as a whole is limited to approximately 35 kg such that the neutron effective multiplication factor per transport vessel becomes lower than the prescribed value. As a result, only two of the nuclear fuel storing drums can be stored in the transport container.

Hence, according to this transportation method under the mass limitation, in transporting a uranium oxide nuclear fuel of which enrichment in recent years ranges from 4% or more to less than 5%, an increase in the number of the transport containers is resulted and considerable transport expense is needed uneconomically.

Meanwhile, there has been adopted a method as a means for increasing the amount of containing the nuclear fuel storing drums in the transport container while holding subcritically the nuclear fuel substance, in which nuclear fuel storing drums a diameter of each of which is set such that the fuel does not reach the critical state in accordance with the enrichment of a uranium oxide nuclear fuel, are used and an inner vessel of a transport container is partitioned by neutron absorber plates in respect of planes in parallel to the vertical central axis of the transport container thereby containing the fuel storing drums in the inner vessel of the transport container. However, according to this method, not only the space for containing the nuclear fuel storing drums in the conventional transport container is reduced, but the structure and the shape of the conventional nuclear fuel storing drum have to be modified and accordingly, the existing nuclear fuel storing drums which have been conventionally used, need to be abandoned and desired nuclear fuel storing drums need to be newly manufactured, which is extremely uneconomical.

SUMMARY OF THE INVENTION

Hence, it is an object of the present invention to provide a method of transporting a nuclear fuel substance capable of increasing the amount of storing a nuclear fuel substance in a transport container by lowering the neutron effective multiplication factor down to a prescribed value or less by arranging partition plates having an effect of absorbing neutrons between a plurality of nuclear fuel storing drums where the nuclear fuel substance is stored, or at the inside of each of the nuclear fuel storing drums in transporting the nuclear fuel substance.

In order to achieve the above-described object, according to the present invention, there is provided a method of transporting a nuclear fuel substance in which in transporting the nuclear fuel substance by containing in a pile a plurality of nuclear fuel storing drums in series where the nuclear fuel substance is stored, in a transport container along the vertical central axis of the transport container having a substantially bottomed cylinder shape, nuclear absorber plates including a component for absorbing neutrons are interposed between the respective nuclear fuel storing drums in respect of planes orthogonal to the vertical central axis of the transport container, wherein the neutron absorber plates are installed on the upper side or the lower side of lids of the respective nuclear fuel storing drums, or laid on the inner bottom portions of the respective nuclear fuel storing drums.

DETAILED DESCRIPTION OF THE INVENTION

Figure 1:
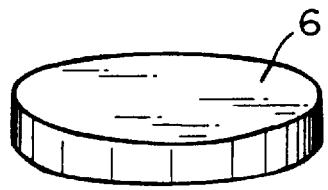
FIG. 1 is a perspective view of a neutron absorber plate used in the method of the present invention.

Next, an explanation will be given of the present invention in reference to the attached drawings.

A transport container used in the present invention, is constituted by an inner vessel 1 comprising a main body 1a having a bottomed cylinder shape which stores a nuclear fuel substance and the upper opening of which is closed by a lid 1b and the lid 1b, an insulating material 2 for shielding heat from outside by surrounding the inner vessel 1 for protecting the inner vessel 1, an outer vessel 3 comprising a main body 3a in a bottomed cylinder shape in which the inner vessel 1 and the insulating material 2 are incorporated, and a lid 3b on one face of which for closing the upper opening of the main body an insulating material 2a is laid, and a plurality of nuclear fuel storing drums 5 each storing a uranium oxide nuclear fuel 4, the upper opening of each of which is closed by a lid 5a, are contained in a pile in series in the inner container 1 along the vertical central axis of the inner vessel 1.

Meanwhile, according to the present invention, neutron absorber plates 6 illustrated by FIG. 1 which are separate and independent from the transport container and the nuclear fuel storing drums 5, including a component of absorbing neutrons and being transportable and removable, are arranged as partitions among the nuclear fuel storing drums 5 by being interposed among the pile of the plurality of nuclear fuel storing drums 5 and on planes orthogonal to the vertical central axis of the transport container.

Figure 2:
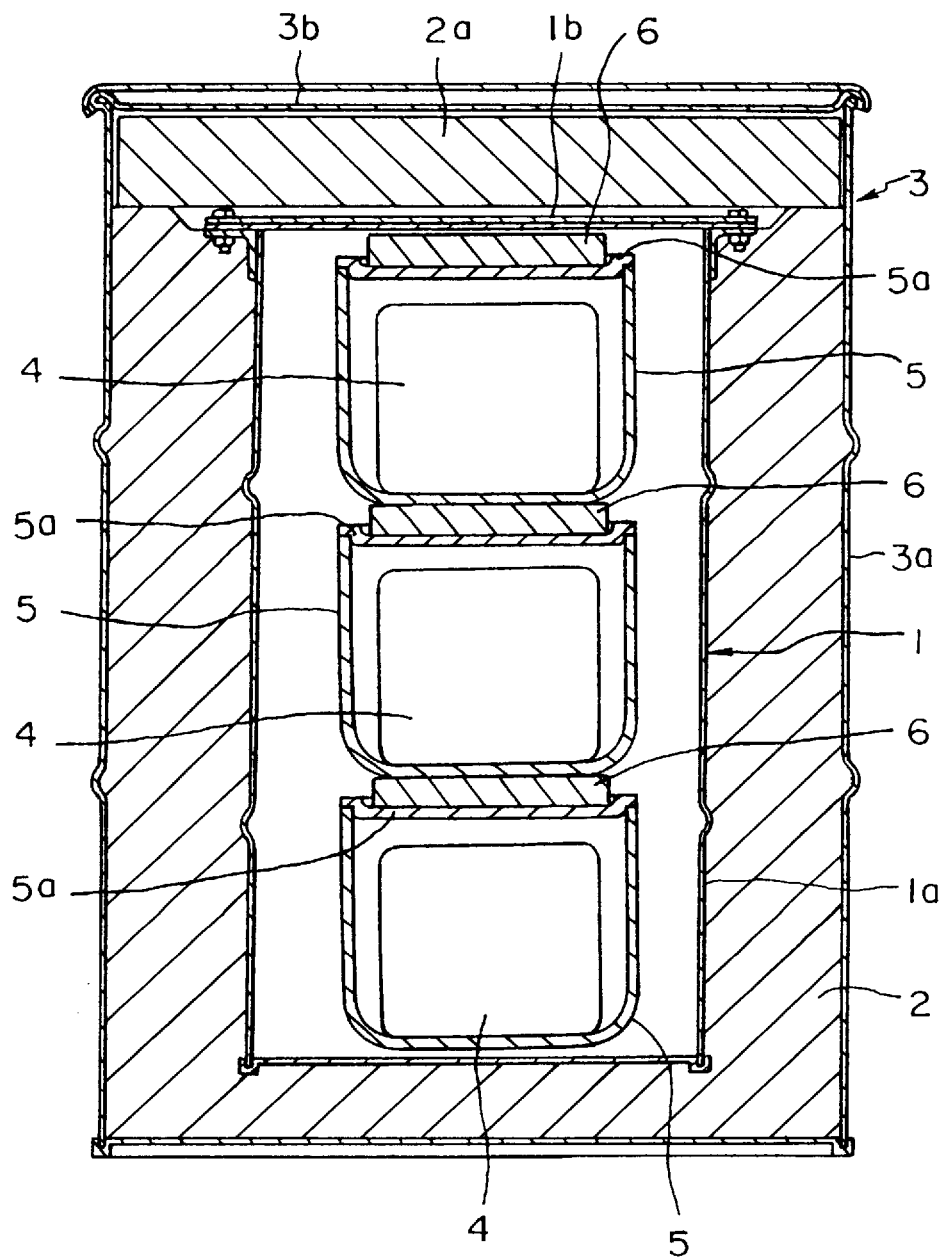
FIG. 2 is a sectional view of a first embodiment of a transport container whereby the method of the present invention is carried out.
Figure 3:
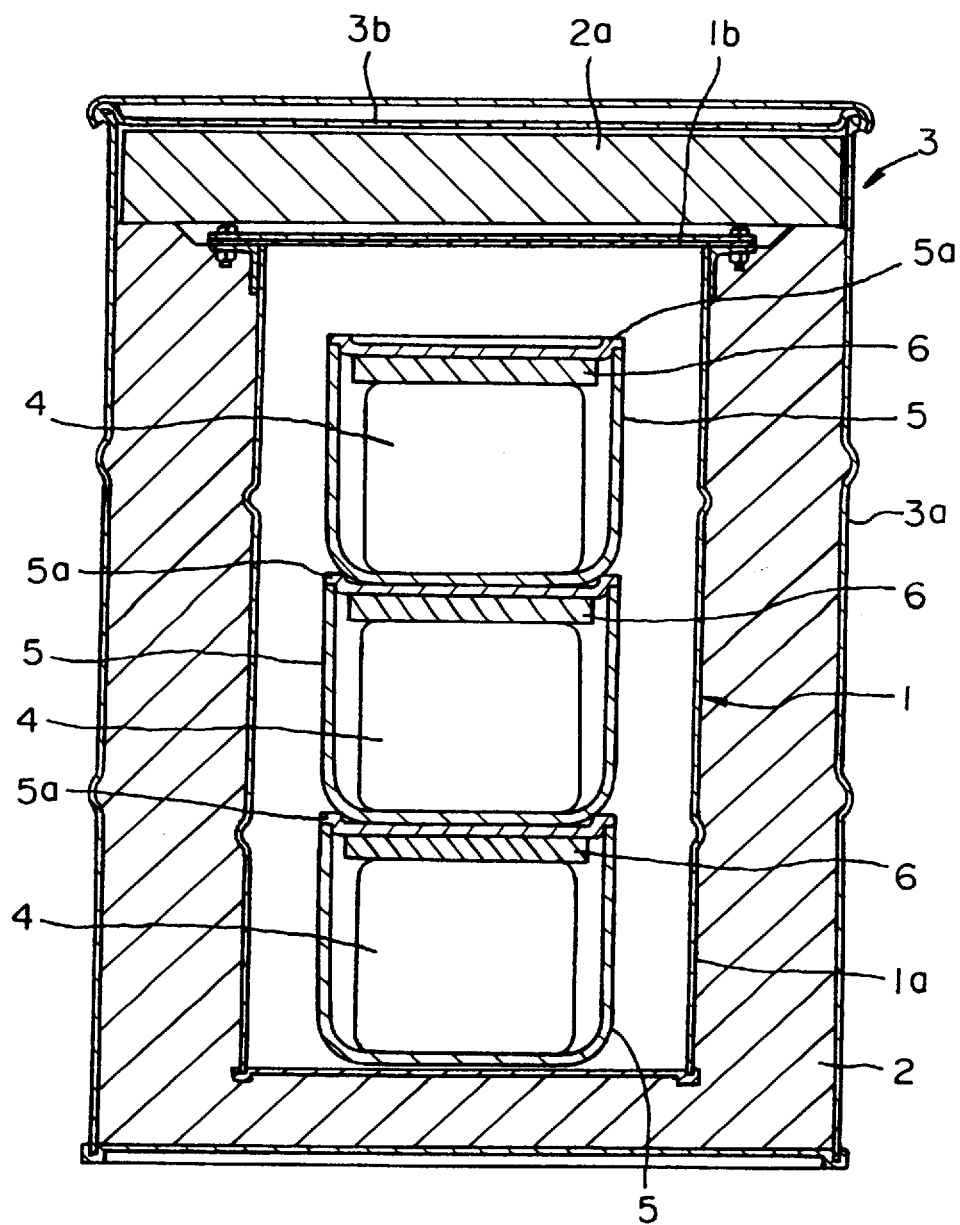
FIG. 3 is a sectional view of a second embodiment of a transport container whereby the method of the present invention is carried out.
Figure 4:
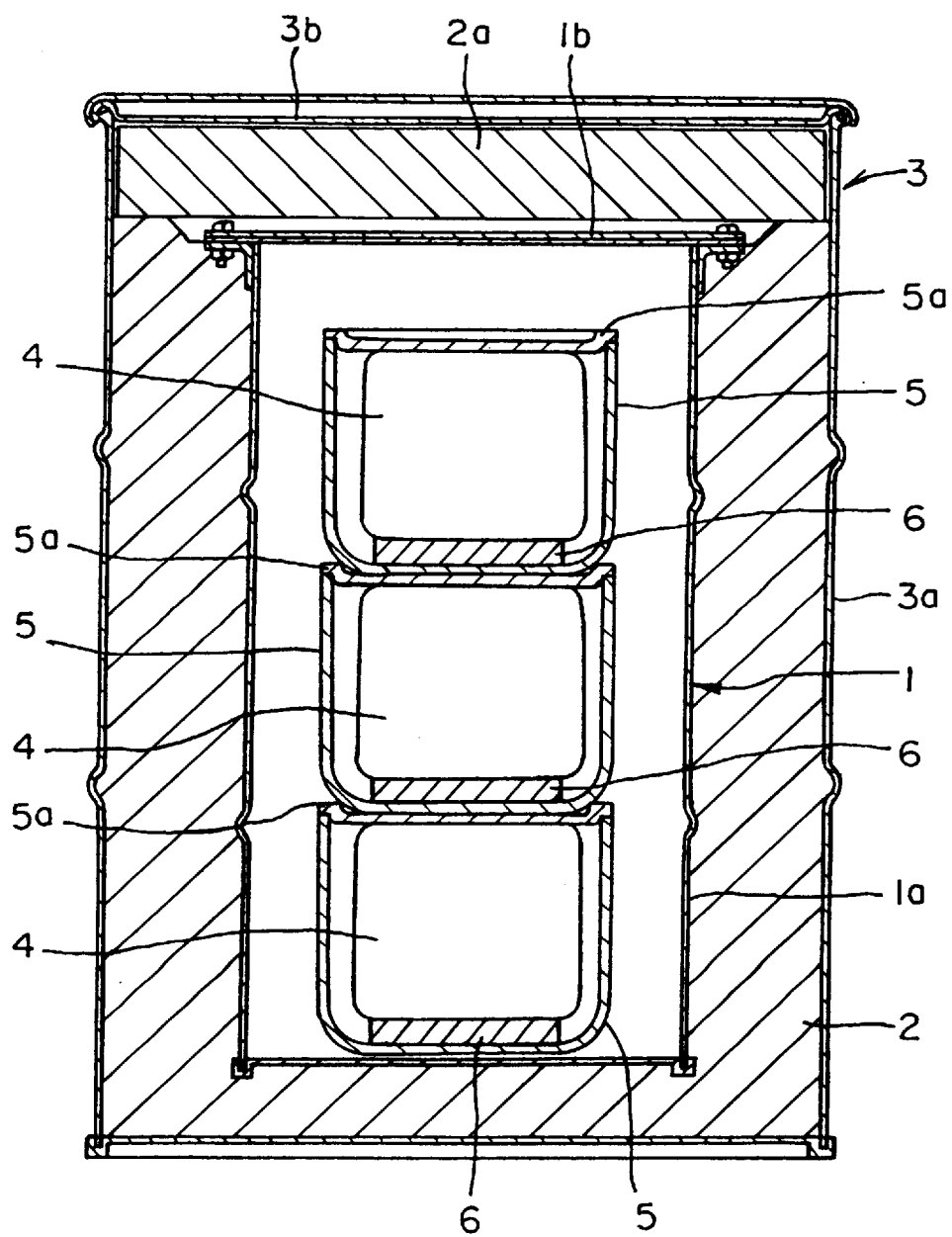
FIG. 4 is a sectional view of a third embodiment of a transport container by which the method of the present invention is carried out.

Specifically, the neutron absorber plates 6 may be mounted on the upper side of the lids 5a of the respective nuclear fuel storing drums 5 as illustrated by FIG. 2, or the neutron absorber plates 6 may be installed on the lower side of the lids 5a of the respective nuclear fuel storing drums 5 and above the uranium oxide fuel 4 as illustrated by FIG. 3, or the neutron absorber plates 6 may be laid on the inner bottom portions of the respective nuclear fuel storing drums 5 where the uranium oxide fuel 4 may be charged thereon and the lids 5a may be fitted as illustrated by FIG. 4.

Further, the neutron absorber plate 6 is formed and worked in a circular plate shape having the plate thickness of 3 mm or more, preferably 3 through 6 mm and the diameter of 260 through 300 mm and is made of 18Cr8Ni stainless steel including a component for absorbing neutrons, for example, 0.8% or more of boron as a component for absorbing neutrons, or a metallic cadmium as a component for absorbing neutrons.

According to the constitution of the present invention, (a) the neutron absorber plates partitioning the respective nuclear fuel storing drums are arranged on the planes orthogonal to the vertical central axis of the transport container by which neutrons among the nuclear fuel storing drums are absorbed and shielded, the amount of the nuclear fuel substance capable of being stored in each of the nuclear fuel storing drums can be increased even with the fuel including a nuclear fission substance having the enrichment of 4% or more and less than 5% and the amount of storing the uranium oxide nuclear fuel per transport container can be increased, and (b) the neutron absorber plates are formed and worked separately and independently from the transport container and the nuclear fuel storing drums such that they can be arranged on the planes orthogonal to the vertical central axis of the transport container by which the mount of storage can be increased with no change or remodelling in respect of the structures, the materials and the shapes of the conventional transport container and the nuclear fuel storing drums. Therefore, the nuclear fuel substance can be transported economically by installing the neutron absorber plates in the transport container while using the conventional transport container and the conventional nuclear fuel storing drums having no means of absorbing neutrons as they are.

EXAMPLES

An explanation will be given of embodiments of the present invention as follows.

Embodiment 1:

Neutron absorber plates made of 18Cr8Ni stainless steel including 0.8% of boron having the plate thickness of 4 mm and the diameter of 280 mm, were arranged to mount on the respective upper sides of lids of three nuclear fuel storing drums (having inner volume capable of storing 26 kg of a nuclear fuel substance) which were contained in a transport container having a bottomed cylinder shape by being piled up in series along the vertical central axis and where a uranium oxide nuclear fuel having the enrichment of approximately 4.9% was stored, orthogonal to the vertical central axis of the transport container as shown by FIG. 2. As a result, the neutron effective multiplication factor was 0.901 and the amount of the enriched uranium oxide nuclear fuel did not reach the amount of criticality.

Embodiment 2:

Neutron absorber plates made of metallic cadmium having the plate thickness of 4 mm and the diameter of 285 mm, were arranged to mount on a uranium oxide nuclear fuel at the insides of respective lids of three nuclear fuel storing drums (having an inner volume capable of storing 26 kg of the nuclear fuel) which were contained in a transport container having a bottomed cylinder shape by being piled in series along the vertical central axis and where the uranium oxide nuclear fuel having the enrichment of approximately 4.9% was stored, orthogonal to the vertical central axis of the transport container as illustrated by FIG. 3. As a result, the neutron effective multiplication factor was 0.899 and the amount of the fuel did not reach the amount of criticality.

Embodiment 3:

Neutron absorber plates made of 18Cr8Ni stainless steel including 0.8% of boron having the plate thickness of 4 mm and the diameter of 270 mm, were arranged under a uranium oxide nuclear fuel on the inner bottom portions of the respectives of three nuclear fuel storing drums (having an inner volume capable of storing 26 kg of the nuclear fuel) which were contained in a transport container having a bottomed cylinder shape by being piled up in series along the vertical central axis and where the uranium oxide nuclear fuel having the enrichment of approximately 4.9% was stored, orthogonally to the vertical central axis of the transport container, as shown by FIG. 4. As a result, the neutron effective multiplication factor was 0.904 and the amount of the fuel did not reach the amount of criticality.

In this way, according to the embodiments of the present invention, in transporting the nuclear fuel storing drums for storing a uranium oxide nuclear fuel substance by being contained in a pile in one transport container, even in the case where three of the nuclear fuel storing drums each storing approximately 26 kg of the nuclear fuel substance having the enrichment of 4% or more and less than 5% in accordance with the inner volume, the neutron effective multiplication factor per transport container can be made lower than the prescribed value and further, the neutron effective multiplication factor can be lowered without changing the structure, the dimensions or the like of the conventional transport container and the conventional nuclear fuel storing drums by which the conventional transport container and the like can be utilized economically.

As stated above, according to the present invention, the respective nuclear fuel storing drums are partitioned by the neutron absorber plates which are independent and separate from the container structure and the nuclear fuel storing drums on the planes orthogonal to the vertical central axis of the transport container and therefore, the following significant effects are achieved.

(1) According to the example of a uranium oxide fuel, even in the case where the enrichment of nuclear fission uranium is high, the fuel can be transported with an amount of charge more than that in the conventional case.

(2) When the neutron absorber plates are interposed among the respective nuclear fuel storing drums in the transport container which are currently used by forming and working the neutron absorber plates in a plate-like shape, an increase in the amount of storing the nuclear fuel substance per transport container can be achieved with no change in the structures, the material and the dimensions of the conventional transport container and the conventional nuclear fuel storing drums and without causing any uneconomical matters such as design change of constituting parts and the like, reforming accompanied thereby and the like.

We claim:

1. A method of packing drums containing nuclear fuel in a generally cylindrical, insulated transport container, each of said drums including a lid and said transport container including a main body formed by a bottom wall and a side wall, and a cover, said main body defining a central axis, said method comprising the steps of:

(a) placing a first drum containing nuclear fuel in the main body of said transport container above the bottom wall thereof, (b) placing a first neutron absorber plate in the main body of said transport container above said first drum so as to extend generally transversely to said central axis, (c) placing a second drum in the main body of said transport container above said first neutron absorber plate, (d) placing a second neutron absorber plate in the main body of said transport container above said second drum so as to extend generally transversely to said central axis, and (e) positioning the cover of said transport contain on said main body to enclose said first and second drums and said first and second neutron absorber plates in said transport container.

2. A method according to claims 1, wherein said main body of said transport container comprises an outer shell, an inner shell and an insulating material therebetween.

3. A method according to claim 1, including between steps (d) and (e) a step of placing a block of insulating material above said second neutron absorber plate.

4. A method according to claim 1, wherein each of said neutron absorber plates is disc shaped and has a thickness of at least 3 mm and a diameter of 260 to 300 mm.

5. A method of packing drums containing nuclear fuel in a generally cylindrical, insulated transport container, each of said drums including a lid and said transport container including a main body formed by a bottom wall and a side wall, and a cover, said main body defining a central axis, said method comprising the steps of:

(a) positioning a first neutron absorber plate in a first drum between nuclear fuel therein and a lid thereof, (b) positioning said first drum containing said first neutron absorber plate in the main body of said transport container above the bottom wall thereof such that said first neutron absorber plate therein extends generally transversely to said central axis, (c) positioning a second neutron absorber plate in a second drum between nuclear fuel therein and a lid thereof, (d) positioning said second drum containing said second neutron absorber plate in the main body of said transport container above said first drum such that said second neutron absorber plate therein extends generally transversely to said central axis, and (e) positioning the cover of said transport container on said main body to enclose said first and second drums in said transport container.

6. A method according to claim 5, wherein said main body of said transport container comprises an outer shell, an inner shell and an insulating material therebetween.

7. A method according to claim 5, including between steps (d) and (e) a step of placing a block of insulating material above said second neutron absorber plate.

8. A method according to claim 5, wherein each of said neutron absorber plates is disc shaped and has a thickness of at least 3 mm and a diameter of 260 to 300 mm.

9. A method of packing drums containing nuclear fuel in a generally cylindrical, insulated transport container, each of said drums including a lid and said transport container including a main body formed by a bottom wall and a side wall, and a cover, said main body defining a central axis, said method comprising the steps of:

(a) positioning a first neutron absorber plate in a first drum between a bottom wall thereof and nuclear fuel therein, (b) placing said first drum with first neutron absorber plate in the main body of said transport container above the bottom wall thereof such that said first neutron absorber plate therein extends generally transversely to said central axis, (c) positioning a second neutron absorber plate in a second drum between a bottom wall thereof and nuclear fuel therein, (d) placing said second drum with said second neutron absorber plate in the main body of said transport container above said first drum such that said second absorber plate therein extends generally transversely to said central axis, and (e) positioning the cover of said transport container on said main body to enclose said first and second drums in said transport container.

10. A method according to claim 9, wherein said main body of said transport container comprises an outer shell, an inner shell and an insulating material therebetween.

11. A method according to claim 9, including between steps (d) and (e) a step of placing a block of insulating material above said second neutron absorber plate.

12. A method according to claim 9, wherein each of said neutron absorber plates is disc shaped and has a thickness of at least 3 mm and a diameter of 260 to 300 mm.

* * * * *